UNITED STATES PATENT OFFICE.

BENJAMIN H. LIGHTFOOT, OF PHILADELPHIA, PENNSYLVANIA.

IMPROVEMENT IN TREATING TANNED LEATHER.

Specification forming part of Letters Patent No. 43,120 dated June 14, 1864; reissue No. 5,016, dated July 30, 1872.

Specification describing an Improved Mode of Treating Tanned Leather, invented by BENJAMIN H. LIGHTFOOT, of Philadelphia, county of Philadelphia, State of Pennsylvania.

Before describing my present invention it will be necessary to allude to my patent of the 17th of November, 1863, in which I claimed "the treatment of tanned leather by the application to the same of petroleum or any oily hydrocarbon holding paraffine in solution, in combination with tallow or its equivalent."

The mode of applying my said patented composition to tanned leather, for the purpose of currying or dressing, is essentially the same as that practiced in using the ordinary dubbing composed of whale or other fish oils and tallow.

In carrying out my said patented invention I discovered that crude petroleums alone, or any of the oily hydrocarbons holding paraffine in solution and of sufficient body and specific gravity, might be applied with good effect to the currying or dressing of many kinds of leather without the intervention of tallow or its equivalent, the petroleums or oils under 35° Baumé being those which, in practice, I have found best adapted for the purpose. These petroleums or oils may be applied to thin calf-skins, or sheep and goat skins, or all kinds of morocco, by rubbing the oil into the same, the currying or dressing of these skins being thereby accomplished in the most satisfactory manner and in a very short space of time, this treatment being better adapted for leather required for shoe soles and heels, as well as for pebble-grain and other leathers, than the treatment with petroleum and tallow—a mixture more suitable for hose, belting, harness, &c.

The oils to be used may be the crude petroleum or any of the oily hydrocarbons holding paraffine in solution, of sufficient body and specific gravity, and preferably purified and deodorized by any of the well-known processes; and in some instances it may be desirable to mix any of these oils with any of the usual fish or streights oil, a suitable proportion for such mixture being about equal quantities of the oily hydrocarbons and the fish or streights oil.

It is evident that such oils or mixture of oils may be advantageously used for oiling harness or other articles of leather, for the purpose of maintaining them in proper pliable condition.

I claim as my invention—

1. The currying or dressing of tanned leather by applying to the same crude petroleum or oily hydrocarbons holding paraffine in solution, with or without an admixture of fish or streights oil, substantially as herein described.

2. As a new article of manufacture, tanned leather curried or dressed by the application thereto of crude petroleum or oily hydrocarbons holding paraffine in solution, with or without an admixture of fish or streights oil.

3. A mixture for dressing tanned leather, &c., consisting of an oily hydrocarbon and fish-oil, or its equivalent.

4. As a new manufacture, leather treated with the said mixture of oily hydrocarbon and fish-oil, or its equivalent.

In testimony whereof I have signed my name to this specification in the presence of two subscribing witnesses.

BENJAMIN H. LIGHTFOOT.

Witnesses:

WM. A. STEEL,
HARRY SMITH.